Aug. 15, 1961 E. P. HURD 2,996,337
WHEEL COVER
Filed Sept. 26, 1957
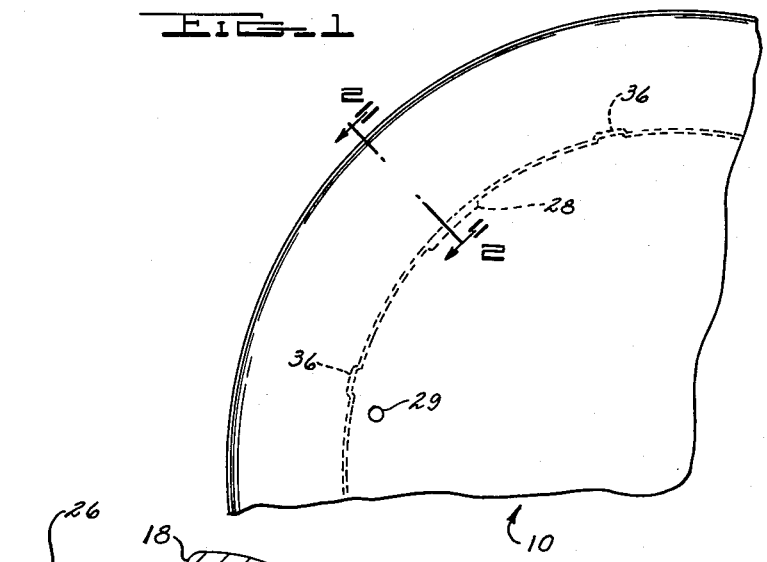
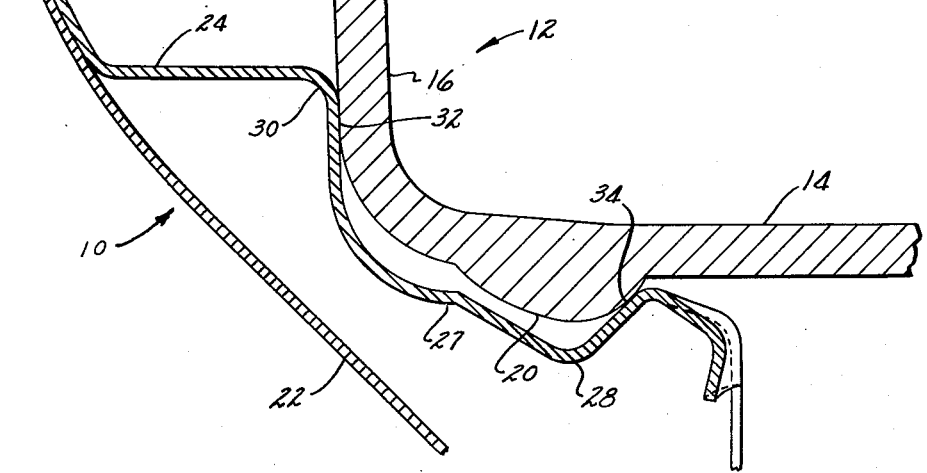
INVENTOR
EDWIN P. HURD
FINN G. OLSEN
ATTORNEY

United States Patent Office 2,996,337
Patented Aug. 15, 1961

2,996,337
WHEEL COVER
Edwin P. Hurd, legally incapacitated, Detroit, Mich., by Anna Mary Hurd, legal representative, Detroit, Mich.; Anna M. Hurd, executrix, of said Edwin P. Hurd, deceased, assignor to Hurd Lock & Manufacturing Company, a corporation of Michigan
Filed Sept. 26, 1957, Ser. No. 681,777
3 Claims. (Cl. 301—37)

The present invention relates to an improved wheel structure, and in particular to a novel arrangement for mounting and retaining a full wheel cover on an automobile wheel.

It is an object of the present invention to provide an improved full wheel cover for automobile wheels which is constructed and arranged so that it can be readily installed and removed from the wheel and which will substantially completely conceal the wheel rim and body part.

It is still another object of the present invention to provide an improved wheel and cover assembly which is characterized by the simple construction employed for retaining the cover on the wheel, such construction permitting a quick and easy assembly of the parts and permitting economical production of the cover.

It is still another object of the present invention to provide an improved wheel and cover assembly of the foregoing character, said assembly being constructed and arranged so that the cover retaining means functions simultaneously to hold the cover on the rim and to prevent relative rotation of the cover with respect to the rim.

Still another object of the present invention is to provide an improved wheel cover assembly wherein the cover substantially conceals the entire drop center type rim, said cover and rim being constructed and arranged so that the spring properties of the cover aid in clamping the side flange and the axial flange of the rim for holding the cover in place.

Another object of the present invention is to provide an improved wheel cover formed from an outer ornamental disk of sufficient size to substantially conceal the rim on which the cover is adapted to be mounted, said disk being adapted to be carried in spaced relation to said rim by an annular member which is connected to the outer periphery of said disk and which is adapted to retain the cover on said rim.

It is still another object of the present invention to provide an improved wheel cover of the foregoing character which is constructed and arranged to limit the extent to which the cover can be telescoped into the rim thereby establishing a predetermined spacing of the peripheral edge of the cover from the rim.

Other objects of this invention will appear in the following description and appended claims, reference being had to the accompanying drawings forming a part of this specification wherein like reference characters designate corresponding parts in the several views.

In the drawings:
FIGURE 1 is a fragmentary side view of a cover embodying the present invention with a portion of the cover attaching means shown in hidden edge lines; and
FIGURE 2 is an enlarged section taken on the line 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, a more detailed description of the invention will be given. A full wheel cover 10 is adapted to be applied to the outer side of a vehicle wheel including a multi-flange drop center type rim 12 such as is in common use. The latter has an intermediate base or axial flange 14 and an outer side flange 16 with a terminal end 18. A plurality of radially inwardly projecting protuberences or bumps 20 are integrally formed in the intermediate axial flange 14. These bumps 20 may be of any suitable number, and in the disclosed embodiment of the invention, four are used. They are preferably circumferentially equidistantly spaced and have their inner-most points arranged in a circle.

The cover 10 is illustrated in the form of a two-piece thin sheet metal construction, comprising an ornamental disk portion 22 of sufficient size to substantially conceal the rim 12 and an annular portion or member 24 which is integrally secured to the disk portion 22 by the interlocked out peripheral edge 26. The annular member 24 is constructed and arranged so that it will cooperate in holding the ornamental disk portion 22 in spaced relation to the terminal edge 18 of the rim 12.

The annular member 24 converges from the interlocked edge 26 substantially radially inwardly for a limited distance along the inner surface of the disk portion 22 after which it extends axially inwardly into engagement with the side flange 16 of the rim 12. Thereafter, the annular member 24 again extends radially inwardly for a distance and then turns axially inwardly in limited spaced relation to the intermediate axial flange 14. The last axially inwardly turned portion forms a continuous flange 27 in which a plurality of pockets or indents 28 are formed, equal in number to the bumps 20 and circumferentially spaced to receive the same. The pockets 28 on each side of the valve stem aperture 29 in the cover have a slightly smaller circumferential dimension so as to fit snuggly on each circumferential side of the associated bumps 20, thereby functioning as antirotation means which prevent rotation of the cover relative to the rim.

As can be seen in FIGURE 2, the axially inner surface of pocket 28 has been cammed over the bump 20 and further inward movement of the cover 10 is prevented because the side of the shoulder portion 30 is abutted against the side flange 16. Thus, the rim 12 is in effect clamped between the points 32 and 34 of the annular member 24.

The present invention also has the radially outwardly projecting lumps 36 spaced intermediate the pockets 28. The projections 36 serve as contact points which together with pockets 28 engage the intermediate flange 14 of rim 12. The circle containing the outer contacting surfaces of projections 36 is slightly larger than the inner surface of intermediate flange 14. This causes the continuous flange 27 to be squeezed out of its true circular shape toward what may be considered an eight sided figure. Naturally, the distortion in this direction is only slight, but it will tend to maintain the flange 27 in tight contact with the intermediate flange 14 at all eight contact points. If a rim is out of round, or not an accurate one from the standpoint of the inner radius of its intermediate flange, the extent to which the flange 27 will be distorted will change, such change being sufficient to accommodate the inaccuracy. However, within reasonable limits the eight contact points will firmly engage the intermediate flange 14 and the shoulder 30 will likewise be firmly seated against the side flange 16, thereby effecting a tight noise-free retention of the cover 10 on the rim 12.

Furthermore, as explained above, at least two of the pockets 28 fit over the bumps 20 so that there will be no rotation of the cover 10 relative to the rim 12. Thus, the retaining means also functions as an anti-rotation feature.

In constructing the cover 10, the annular member 24 will be formed from a metal having resilient properties and the diameter of the continuous flange 27 is such that the pockets 28 and projections 36 will engage the intermediate flange 14, and the projections 36 with the continuous flange 27 will absorb all the vertical road shocks thereby relieving the cover retaining pockets 28 of this duty. Note that the shoulder 30 fits against the side flange 16 and not under the side flange so that there will be no tendency for vertical road shocks to urge the cover 10 away from the rim 12 as would be the case if the cover 10 engaged the rim at the rounded intersection of the side and intermediate flanges 16 and 14. Thus, the pockets 28 in cooperation with the projections 36 and shoulder 30 act to hold the cover in place with no vibrations occurring and with no opportunity for vertical road shocks to dislodge the cover from the wheel. Furthermore, the pockets 28 operate most effectively to prevent relative rotation of the cover 10 with respect to rim 12.

The fact that the flange 27 is continuous and the pockets 28 and projections 36 are formed therein as an integral part has the additional advantage that the flange 27 acts as a spring urging the pockets 28 against the wheel bumps 20. By virtue of this construction and arrangement the pockets in cooperation with projections 36 will always maintain uniform holding of the bumps 20.

The manner in which the cover 10 has its two parts joined at the interlocked edge 26 and thereafter the annular member 24 fits against the disk portion 22 is another feature of the present invention because it provides a simple pry-off structure and at the same time assures that the peripheral edge will be protected from undesirable bending because of the reinforcing properties of the annular member 24.

What is claimed is:

1. In combination, a wheel having a body part and a drop center type rim wherein the intermediate axial flange has a plurality of radially inwardly projecting bumps which are circumferentially spaced, and a cover for disposition at the outer side of said wheel for concealing said body part and said rim, said cover having a dish-shaped ornamental portion with its outer periphery in spaced relation to the terminal flange of said rim, a radially and axially inwardly extending flange portion joined to said ornamental portion at the outer periphery of the latter and telescoping within said intermediate axial flange, said flange portion having a shoulder seated on the side flange of said rim and a plurality of indents fitted over said bumps, said rim being clamped between said shoulder and said indents to hold the cover on the wheel, said flange portion having a plurality of radially outwardly directed portions located circumferentially intermediate said indents in engagement with said axial flange so that the flange portion is urged out of round tending to press the indents more firmly on said bumps.

2. In combination, a wheel having a drop center type rim, with an outer side flange and an intermediate axial flange, the latter having a plurality of radially inwardly projecting bumps which are circumferentially spaced, and a wheel cover for disposition at the outer side of said wheel, said cover having a disk portion whose radially outer periphery overlies the terminal edge of said rim and an annular portion connected to said disk portion, said annular portion having a shoulder seated on the outer side flange of said rim and an axially inwardly extending continuous flange of slightly less diameter than said intermediate axial flange and telescoped thereinto, said continuous flange having a plurality of circumferentially spaced indents adapted to fit over said bumps, the axially inner side of said indents seated firmly on said bumps and cooperating with said shoulder for clamping said rim to hold the cover on the wheel, said continuous flange also having a plurality of radially outwardly projecting lumps located circumferentially intermediate said indents contacting said intermediate axial flange, the radially outer portions of said lumps being in a circle slightly greater in diameter than the inner surface of said intermediate axial flange so that when the cover is pressed onto said rim the lumps will tend to force the continuous flange out of round thereby urging the indents into tighter seating relationship on the bumps of said rim.

3. In combination, a wheel having a drop center type rim with a side flange and an intermediate axial flange, the latter having a plurality of radially inwardly projecting bumps which are circumferentially spaced, and a wheel cover for disposition at the outer side of said wheel, said cover having a disk portion whose radially outer periphery extends radially outwardly to the terminal edge of said rim and an annular portion connected to said disk portion at the outer peripheral edge thereof, said annular portion fitting against the inner surface of said disk for a limited distance after which it extends axially inwardly to form a shoulder seated on the outer side flange of said rim after which it converges toward the axis of the cover and extends further inwardly in an axial direction to form a continuous flange of slightly less diameter than said intermediate axial flange and fitted therein in telescoped relation, said continuous flange having a plurality of circumferentially spaced indents fitting over said bumps, the axially inner side of said indents seating firmly on said bumps and cooperating with said shoulder for clamping said rim to hold the cover on the wheel, said continuous flange also having a plurality of radially outwardly projecting lumps located circumferentially intermediate said indents and contacting said intermediate axial flange, the radially outer portions of said lumps being in a circle slightly greater in diameter than the inner surface of said intermediate axial flange so that when the cover is pressed onto said rim the lumps will tend to force the continuous flange out of round thereby urging the indents into tighter seating relationship on the bumps of said rim.

References Cited in the file of this patent

UNITED STATES PATENTS

| | | |
|---|---|---|
| 2,308,616 | Lyon | Jan. 19, 1943 |
| 2,535,081 | Lyon | Dec. 26, 1950 |
| 2,624,640 | Lyon | Jan. 6, 1953 |
| 2,698,203 | Landell | Dec. 28, 1954 |
| 2,725,257 | Maurer et al. | Nov. 29, 1955 |
| 2,761,530 | Dawley | Sept. 4, 1956 |
| 2,867,477 | Lyon | Jan. 6, 1959 |

FOREIGN PATENTS

| | | |
|---|---|---|
| 462,780 | Canada | Jan. 31, 1950 |
| 1,100,164 | France | Mar. 30, 1955 |
| 744,837 | Great Britain | Feb. 15, 1956 |